Patented May 2, 1950

2,506,386

UNITED STATES PATENT OFFICE 2,506,386

METHYL GERMANIUM COMPOUNDS AND METHODS OF PREPARING THE SAME

Eugene G. Rochow, Schenectady, N. Y., assignor to General Electric Company, a corporation of New York No Drawing. Application December 13, 1947, Serial No. 791,664

7 Claims. (Cl. 260—429)

This invention relates to methyl germanium compounds and methods of preparing the same. More particularly, the invention is concerned with a process for making a methyl germanium compound, for example, dimethyl germanium sulfide, which process comprises (1) mixing a methyl germanium halide with water, (2) passing hydrogen sulfide into and through the water mixture, and (3) isolating the insoluble methyl germanium sulfide formed thereby.

Although germanium and silicon are in the same group in the periodic table, nevertheless, analogous derivatives of these elements, for example, dimethyl germanium dichloride and dimethyl silicon dichloride (dimethyldichlorosilane), behave differently when each of these derivatives is hydrolyzed with water. Thus, dimethyl germanium dichloride, when hydrolyzed with an excess of water, yields a solution in which the hydrolyzed dimethyl germanium dichloride is completely miscible with and soluble in the water. Attempts to isolate the dimethyl germanium oxide, for example, by evaporation, results in a reversal of the reaction and a regeneration of the volatile starting material, dimethyl germanium dichloride. On the other hand, when dimethyldichlorosilane is hydrolyzed in an excess of water, there immediately forms a separate layer comprising the polymeric dimethyl silicon oxide which is insoluble in water and which can readily be separated therefrom.

Because of the solubility of the methyl germanium oxides in water, it has heretofore been impractical to prepare methyl germanium oxides directly by hydrolysis of the methyl germanium halides. I have now discovered that I can prepare methyl germanium compounds, for example, methyl germanium oxides and methyl germanium sulfides, from methyl germanium halides by mixing or hydrolyzing the latter in water, passing hydrogen sulfide into the water mixture, and thereafter isolating the insoluble methyl germanium sulfide formed thereby. If the methyl germanium oxide is desired, the isolated methyl germanium sulfide is hydrolyzed in the presence of a suitable catalyst, e. g., an oxidizing agent or acid incapable of forming a compound easily volatilized under the conditions of the reaction. Thus the presence of hydrogen chloride in the hydrolyzing medium would immediately result in the formation of volatile methyl germanium chloride, which it is desired to avoid.

The simple methyl germanium compounds embraced by my invention may be considered as represented by the general formula

where Z is a member selected from the class consisting of sulfur and oxygen. The methyl germanium compounds may also exist in the polymeric form as represented by the general formula

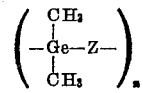

where Z has the meaning given above and $n$ is a whole number greater than 1, e. g., from 4 to 8, or more. The cohydrolysis of monomethyl germanium hydrolyzable compounds as illustrated below may lead to methyl germanium polymers having cross-linked skeletal structures as illustrated by the following general formula

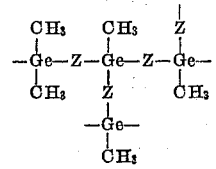

The starting materials from which the methyl germanium oxides and sulfides are prepared may be considered as represented by the general formula $(CH_3)_n Ge(X)_{4-n}$ where X is a halogen, for example, chlorine, bromine, fluorine, etc., and $n$ is a whole number equal to from 1 to 3, inclusive. Examples of such methyl germanium halides are, for instance, methyl germanium trichloride, dimethyl germanium dichloride, trimethyl germanium bromide, dimethyl germanium dichloride, methyl germanium tribromide, etc. It will, of course, be understood by those skilled in the art that other methyl germanium compounds with hydrolyzable groups other than halogen may be employed, e. g., dimethyl diethoxy germane, methyl germanium triacetate, etc.

The method whereby the methyl germanium compounds may be prepared may be varied within wide limits. One method comprises mixing or hydrolyzing the methyl germanium halide in water, preferably in an amount in excess of that required to effect complete hydrolysis of the methyl germanium halide. It has been found that amounts of water less than that necessary to hydrolyze and completely dissolve the methyl germanium halide may also be employed.

Thereafter, the water solution or mixture comprising the hydrolyzed product of the methyl germanium halide is saturated with hydrogen sulfide by passing gaseous hydrogen sulfide through the hydrolysis mixture until no further precipitation of the methyl germanium sulfide is apparent. The insoluble methyl germanium sulfide formed in accordance with the foregoing procedure is isolated, for example, by filtration. If the methyl germanium oxide is desired, the aforementioned methyl germanium sulfide is then hydrolyzed in water preferably, though not essentially, in the presence of a suitable catalyst, for example, hydrogen peroxide, sulfuric acid, acetic acid, phosphoric acid, potassium permanganate, potassium persulfate, nitric acid, etc. In hydrolyzing the methyl germanium sulfide with only water, acceleration of the hydrolysis reaction may be accomplished by heating the mixture to effect evolution of hydrogen sulfide. The methyl germanium oxide may be isolated from this latter mixture by evaporation or distillation of the water, advantageously under reduced pressure.

In the preparation of the methyl germanium oxide from the methyl germanium sulfide, the concentration of the hydrolysis medium containing the catalytic agent may be varied within wide limits. Good results are obtained when, e. g., from 0.01 to 20, preferably from 0.1 to 10 per cent, by weight, of the catalyst, based on the weight of the water, is employed. It will, of course, be apparent to those skilled in the art that the proportion of catalyst will affect the rate at which the methyl germanium oxide is formed, and that larger or smaller amounts of catalyst may be employed.

Although the temperature at which the conversion of the methyl germanium sulfide to the methyl germanium oxide takes place may also be varied within wide limits, it is preferable that the mixture comprising the methyl germanium sulfide, the water and the catalyst be heated at above room temperatures, for example, from 50° to 100° C. in order to accelerate the conversion of the methyl germanium sulfide to the methyl germanium oxide.

In order that those skilled in the art may better understand how the present invention may be practiced, the following examples are given by way of illustration and not by way of limitation. All parts are by weight.

Example 1

About 444 parts dimethyl germanium dichloride (prepared in accordance with the process disclosed and claimed in my pending application, Serial No. 662,625, filed April 16, 1946, now U. S. Patent 2,444,210 issued June 29, 1948, and assigned to the same assignee as the present invention) was refluxed with about 92 parts (an excess) water for 15 minutes and allowed to stand for about 18 hours. At the end of this time, attempts to isolate the dimethyl germanium oxide from the water solution by evaporation to dryness resulted in reversal of the dimethyl germanium oxide to dimethyl germanium dichloride, and loss of all the products due to volatility of the dimetryl germanium dichloride.

Example 2

In this example 100 parts dimethyl germanium dichloride [$(CH_3)_2GeCl_2$] was stirred with 1000 parts water. This water mixture was treated with hydrogen sulfide by passing the latter through the mixture for a period of time (about 48 hours) until no further evidence of precipitation of dimethyl germanium sulfide was present. The precipitate was washed with water and recrystallized from alcohol, and dried to yield 73.4 parts dimethyl germanium sulfide, which represented a yield of 94.5 per cent of the theoretical. The compound melts at 55.5° C. and has a boiling point of 302° C. Analysis of this compound showed it to comprise the following:

|  | Found | Calculated For $(CH_3)_2GeS$ |
|---|---|---|
| Per Cent Carbon | 17.85 | 17.83 |
| Per Cent Hydrogen | 4.49 | 4.49 |
| Per Cent Germanium | 51.80 | 63.90 |
| Per Cent Sulfur | 23.76 | 23.80 |

Example 3

About 8 parts of the dimethyl germanium sulfide prepared in Example 2 was refluxed with a mixture comprising 30 parts water and 15 parts of 30 per cent $H_2O_2$ for 5½ hours. At the end of this time the evolution of $H_2S$ had ceased and the sample had dissolved. Sufficient barium hydroxide was added until the mixture was alkaline to phenolphthalein and the barium sulfate thus formed was filtered off. The filtrate now containing only methyl germanium oxide or hydroxide in water was distilled at atmospheric pressure until at a temperature of about 102° C. only a viscous syrup remained. This viscous syrup, when distilled under vacuum, became gelatinous and then resinous. The resin could not be melted and when heated strongly simply frothed but did not flow. Analysis of the product gave the following results:

4.17 per cent hydrogen
15.14 per cent carbon
53.57 per cent germanium

The foregoing results show that the resin contains an average of about 1.71 methyl groups per germanium atom. It may, therefore, be considered that the use of the 10 per cent $H_2O_2$ resulted in oxidation of about ⅕ of the methyl groups under the conditions used. The use of lower concentrations of peroxide for shorter periods would have less effect in reducing the methyl-to-germanium ratio.

Example 4

About 76.3 parts dimethyl germanium sulfide [$(CH_3)_2GeS$] was refluxed with 200 parts water and about 5 parts concentrated sulfuric acid for 7 hours until there no longer was a rapid evolution of hydrogen sulfide. A dilute aqueous solution of barium hydroxide was then added dropwise until the solution was just alkaline to phenolphthalein, and the barium sulfate was filtered off. The clear filtrate was evaporated under reduced pressure to a viscous liquid and the remaining water was removed by distillation together with a small amount of volatile dimethyl germanium oxide or hydroxide in the range of about 100° to 105° C. The boiling point rose rapidly to over 200° C. and a polymer of dimethyl germanium oxide distilled. Purification of this polymer showed it to be a white crystalline compound melting at 133.4° C. and having a boiling point of 211° C. Analysis of the composition showed it to have the empirical composition $(CH_3)_2GeO$ as evidenced by the following analytical results:

|  | Found | Calculated |
| --- | --- | --- |
| Per Cent Carbon | 20.43 | 20.24 |
| Per Cent Hydrogen | 5.21 | 5.10 |
| Per Cent Germanium | 60.62 | 61.20 |
| Per Cent Oxygen (by difference) | 13.74 | 13.46 |

Molecular weight determination of the above-described dimethyl germanium oxide showed it to be the cyclic tetramer having the formula

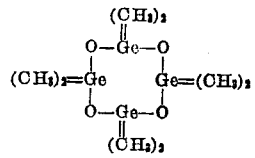

Example 5

About 17.3 parts dimethyl germanium sulfide prepared as in Example 2 were refluxed with about 300 parts distilled water for 15½ hours. Hydrogen sulfide was evolved slowly. The solution was distilled at atmospheric pressure to yield a residual syrupy mass which was further evaporated in vacuo leaving a white crystalline residue which melted readily. Analysis of this crystalline mass showed that it contained 5.01 per cent hydrogen, 19.67 per cent carbon and 69.7 per cent germanium. Based on the carbon analysis it was calculated that the methyl-to-germanium ratio was about 1.95, and based on the hydrogen analysis was 1.98, established that essentially pure dimethyl germanium oxide was present.

The methyl germanium oxides and methyl germanium sulfides embraced by my invention have utility as intermediates in the preparation of resins and other chemical compounds. Certain of the methyl germanium oxides, because of their water solubility and germanium content, may have utility as therapeutic agents for stimulating the production of red blood cells in mammals, in view of the work of many investigators showing the efficacy of germanium dioxide for the same purpose.

What I claim as new and desire to secure by Letters Patent of the United States is:

1. The process for making a methyl germanium compound which comprises (1) mixing a methyl germanium halide with water, (2) passing hydrogen sulfide into the water mixture, and (3) isolating the insoluble methyl germanium sulfide formed thereby.

2. The process for preparing a methyl germanium oxide which comprises (1) mixing a methyl germanium halide with water, (2) passing hydrogen sulfide into the water mixture, (3) isolating the insoluble methyl germanium sulfide formed in (2), and (4) hydrolyzing the methyl germanium sulfide to the methyl germanium oxide in the presence of hydrogen peroxide.

3. The process for preparing a methyl germanium oxide which comprises (1) mixing a methyl germanium halide with water, (2) passing hydrogen sulfide into the water mixture, (3) isolating the insoluble methyl germanium sulfide formed in (2), and (4) hydrolyzing the methyl germanium sulfide to the methyl germanium oxide with an aqueous solution of sulfuric acid.

4. The method for making dimethyl germanium sulfide which comprises (1) mixing a dimethyl germanium dihalide with water, (2) passing hydrogen sulfide into the water mixture, and (3) isolating the insoluble dimethyl germanium sulfide formed thereby.

5. The process for preparing a dimethyl germanium oxide which comprises (1) mixing dimethyl germanium dichloride with water, (2) passing hydrogen sulfide into the water mixture, (3) isolating the insoluble dimethyl germanium sulfide formed in (2), and (4) hydrolyzing the dimethyl germanium sulfide to the dimethyl germanium oxide with aqueous hydrogen peroxide.

6. The process for preparing dimethyl germanium oxide which comprises (1) mixing dimethyl germanium dichloride with water, (2) passing hydrogen sulfide into the water mixture, (3) isolating the insoluble dimethyl germanium sulfide formed in (2), and (4) hydrolyzing the dimethyl germanium sulfide to the dimethyl germanium oxide with an aqueous solution of sulfuric acid.

7. Dimethyl germanium sulfide.

EUGENE G. ROCHOW.

REFERENCES CITED

The following references are of record in the file of this patent:

Pugh, "Jour. Chem. Soc." (London), vol. 1930, pages 2369–2373.

Bauer et al., "Ber. Deutsch. Chem. Gas.," vol. 65, (1932), pages 956–960.

Horvitz et al., "Jour. Am. Chem. Soc.," vol. 55, (1933), page 5055.